United States Patent
Kerofsky

(10) Patent No.: US 8,327,411 B2
(45) Date of Patent: Dec. 4, 2012

(54) LOW-LATENCY RANDOM ACCESS TO COMPRESSED VIDEO

(75) Inventor: Louis J. Kerofsky, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 907 days.

(21) Appl. No.: 10/726,306

(22) Filed: Dec. 1, 2003

(65) Prior Publication Data

US 2005/0117055 A1    Jun. 2, 2005

(51) Int. Cl.
| | |
|---|---|
| H04N 7/173 | (2011.01) |
| H04N 7/12 | (2006.01) |
| H04N 11/02 | (2006.01) |
| H04N 11/04 | (2006.01) |

(52) U.S. Cl. ........ 725/116; 725/118; 725/127; 725/114; 348/438.1

(58) Field of Classification Search ............. 725/86–104
See application file for complete search history.

(56) References Cited

U.S. PATENT DOCUMENTS

| | | | |
|---|---|---|---|
| 5,543,925 A | 8/1996 | Timmermans | |
| 5,995,518 A * | 11/1999 | Burns et al. | 370/503 |
| 6,370,274 B1 | 4/2002 | Peters et al. | |
| 6,543,053 B1 * | 4/2003 | Li et al. | 725/88 |
| 6,665,872 B1 * | 12/2003 | Krishnamurthy et al. | 725/95 |
| 7,610,605 B2 | 10/2009 | Negishi et al. | |
| 2002/0095681 A1 * | 7/2002 | Lin et al. | 725/87 |
| 2002/0146236 A1 | 10/2002 | Kauffman et al. | |
| 2003/0088877 A1 * | 5/2003 | Loveman et al. | 725/92 |
| 2004/0025184 A1 * | 2/2004 | Hakenberg et al. | 725/90 |
| 2006/0140276 A1 | 6/2006 | Boyce et al. | |
| 2006/0156374 A1 * | 7/2006 | Hu et al. | 725/135 |
| 2007/0098079 A1 | 5/2007 | Boyce et al. | |

FOREIGN PATENT DOCUMENTS

| | | |
|---|---|---|
| JP | 2003037818 A | 2/2003 |
| WO | 2004/114667 A1 | 12/2004 |
| WO | 2004/114668 A1 | 12/2004 |

OTHER PUBLICATIONS

J. Mitchell et al., "MPEG Video Compression Standard", New York: Chapman & Hall, 1997, Chapter 2.

(Continued)

*Primary Examiner* — Nasser Goodarzi
*Assistant Examiner* — Mushfikh Alam
(74) *Attorney, Agent, or Firm* — Kristine Elizabeth Matthews; David C. Ripma

(57) ABSTRACT

A method and apparatus for achieving low-latency, and rapidly attained high-resolution, access reception for transmitted and received video data involving the pre-transmission dividing of a source video stream into two downstream-deliverable data streams that differ by, on the one hand, low-latency, low-resolution characteristics for one stream, and on the other hand, higher-latency, higher-resolution characteristics for the other stream. Latency in these streams is determined by the frame spacing created between stream-inserted marker I-frames. The divided streams are multiplexed and transmitted. At the receiving end, monitoring, selecting and video output-signal switching take place under rules whereby the first-encountered marker frame in either stream directs that stream to provide the first content for the video output signal. If the first-encountered marker resides in the higher-resolution stream, the process ends. If it is the lower-resolution stream, a switch to the higher-resolution stream takes place on detection of the next-encountered marker frame in the higher-resolution stream.

5 Claims, 1 Drawing Sheet

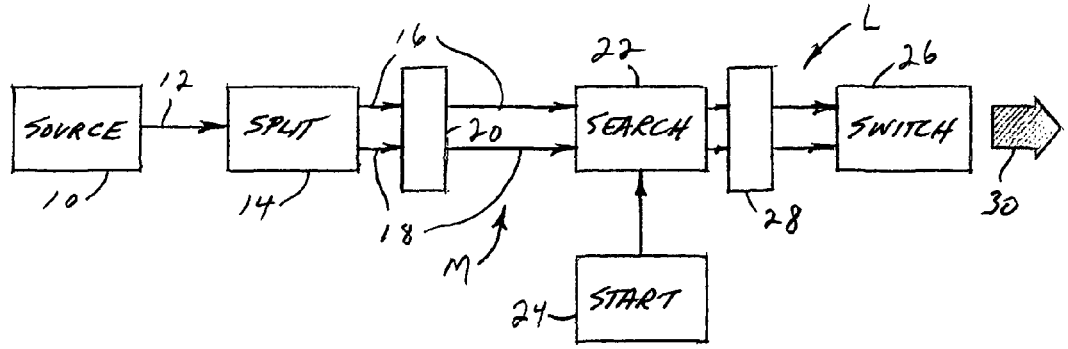

OTHER PUBLICATIONS

G. Sullivan, "On Random Access and Bitstream Format for JVT Video", Joint Team Video Team (JVT) of ISO/IEC MPEG & ITU-T VCEG document JVT-B063, Jan. 2002.

X. Li et al., "High Performance Resolution Scalable Video Coding via All-Phase Motion Compensation Prediction of Wavelet Coefficients", Visual Communications and Image Processing 2002, vol. 4671, pp. 1080-1090.

Japanese Office Action—Patent Application No. 2004-332951—Dispatch Date Aug. 25, 2009.

Japanese Office Action—Patent Application No. 2004-332951—Dispatch Date Jan. 5, 2010.

Japanese Office Action—Japanese Patent Application No. 2004-332951—Dated Jul. 27, 2010.

* cited by examiner

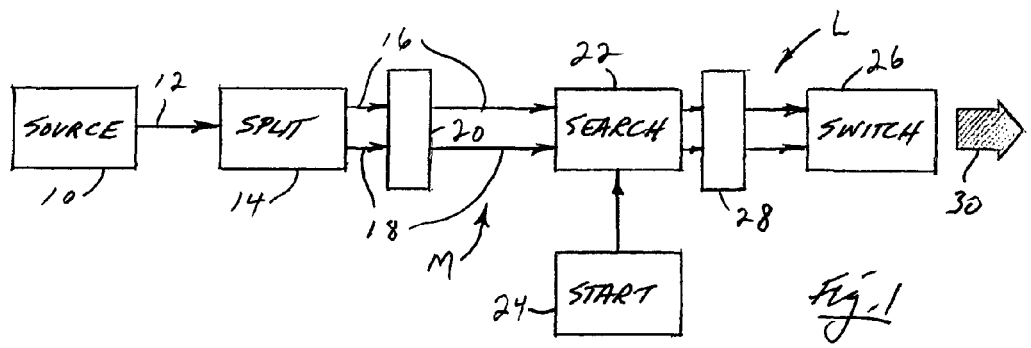

Fig. 1

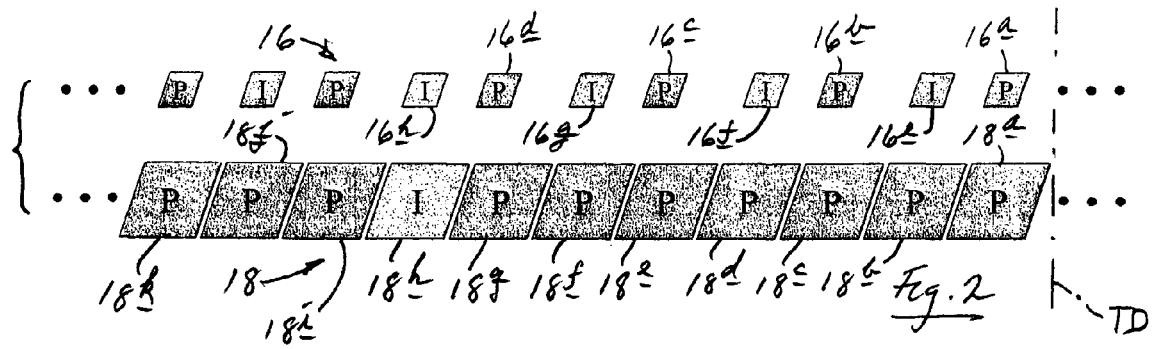

Access Latency with I-frame period T

| I-frame period | Maximum | Mean | Standard Deviation |
|---|---|---|---|
| T | T | $\frac{T}{2}$ | $\sqrt{\frac{T^2}{12}}$ |
| 1.0s | 1000ms | 500ms | 289ms |
| 0.1s | 100ms | 50ms | 29ms |

Fig. 4

Sample Parameter values

|  | Low-Latency | Main |
|---|---|---|
| Resolution | Q-NTSC | NTSC |
| Frame Rate | 10Hz | 30 Hz |
| Bitrate | 50Kbps | 3Mbps |
| I-frame rate | 10Hz | ½ Hz |

Fig. 5

Access Latency corresponding to sample coding parameters

| Stream | Maximum | Mean | Standard Deviation |
|---|---|---|---|
| Low-Latency | 100ms | 50ms | 29ms |
| Main | 1000ms | 500ms | 289ms |

Fig. 6

LOW-LATENCY RANDOM ACCESS TO COMPRESSED VIDEO

BACKGROUND AND SUMMARY OF THE INVENTION

This invention relates to random access to a compressed video data stream (bit stream), and in particular to methodology and a system (or apparatus) for furnishing and enabling low-latency random access to such a stream.

In both the systemic and methodologic realms, the invention involves, among other things, both the preparing of a conventional video data stream for low-latency, and quickly achieved high-quality (resolution) random access, and the ultimate reception and utilization (i.e. viewing) of that prepared data stream. For the purpose of illustration herein, a preferred and best-mode embodiment of, and manner of implementing and practicing, the invention are disclosed and illustrated in the context of television channel surfing-a representative setting wherein the invention has been found to offer special utility. This context is aptly representative generally of the invention's useful applicability in the areas of video broadcasting and video streaming.

By way of general background regarding conventional understanding, due to temporal prediction, a video decoder cannot begin decoding a video data stream at a frame that is predicted from previous frames. Many applications require a user to be able enter a bit stream at any time, such as during the activity known as channel surfing between broadcast streams, and during reverse, or fast-forward, "trick" video modes. A typical technique for providing random access to a compressed bit stream involves the insertion of so-called I-frames, or intra-frames. Such I-frames are pictured and employed herein, and are also referred to as video marker frames. I-frames are typically inserted into a so-called Group Of Pictures (GOP) structure, and are coded without any prediction from other frames. They are inserted at an interval, or rate, (R). A decoder is able to access an associated video data stream at any such inserted I-frame. The latency involved in random access in such a GOP is inversely proportional to R, while the compression performance decreases as R increases. As an example, I-frames are typically inserted periodically in MPEG-2 format to provide random access.

Another concept in the prior art involves the so-called concept of "dirty random access", regarding which an access point does not begin with a clean I-frame. Rather, in this approach, a decoder begins decoding and displaying predicted frames without having access to a complete reference frame. Blocks of the frames are intra-coded so that, after some time, a clean picture is attained.

Other approaches to dealing with random access latency have been proposed in the prior art and are generally familiar to those generally skilled in the art.

The present invention departs from prior art approaches by proposing the creation, from an "engaged" source video data stream, of a compressed and either slightly time-offset (preferable), or time-synchronized, pair of divided video data streams (called downstream-deliverable streams) that are drawn directly from the source stream, and that are characterized by possessing respective, different access latencies and resolutions. In particular, and according to a preferred manner of practicing and implementing the invention, such a source data stream is split into two data streams which are slightly time-offset with respect to one another, with one of these streams being specifically characterized with a relatively low access latency (the stream which is slightly time-delayed relative to the other stream) and a relatively low image resolution, and with the other stream being characterized by a larger access latency, and a significantly larger, or greater, image resolution.

These two streams are preferably multiplexed and transmitted so as to be received at a receiving site where they can, in terms of certain fundamental steps practiced by a portion of the present invention, be (a) sought, (b) monitored, (c) and selected in a manner, which uniquely introduces a definitive low-latency access, followed by a rapidly achieved, high-resolution image display.

These, and various other features and advantages, which are offered and attained by the system, apparatus and methodology of the present invention will be more fully appreciated in light of the detailed description which shortly follows, when read in conjunction with the accompanying drawings.

DESCRIPTION OF THE DRAWINGS

FIG. 1 is a block/schematic diagram illustrating a high-level "picture" of the methodology and the apparatus of a preferred and best-mode embodiment of, and manner of practicing, the present invention.

FIG. 2 illustrates schematically the characteristics of two differently characterized, downstream-deliverable video data streams which are created for multiplexed transmission in accordance with practice of the present invention.

FIG. 3 is a schematic representation of how a dual-data-stream video transmission, such as that pictured in FIG. 2, created by practice of the invention, is utilized at a receiving viewer's location by receiving apparatus which is constructed in accordance with the invention to provide definitive low-latency, quickly established high-resolution, access effectively to a source video data stream.

FIGS. 4, 5 and 6 present respective different tables of information that are employed to highlight, in relation to prior-art conditions, various features of the present invention.

DETAILED DESCRIPTION OF THE INVENTION

As mentioned above, the present invention is described herein in relation to its utility in the contexts both of video broadcasting and video streaming. The description which now follows should be read with the understanding that it is presented in a manner intended to highlight the utility of the invention in these two particular areas of video data transmission and reception. Additionally, FIG. 1 in the drawings should be viewed now as an illustration which pictures both the systemic and methodologic characteristics of the present invention.

In FIG. 1, a block 10 represents a source for supplying an uncompressed, output video data stream 12 (pictured as an arrow), which data stream has a particular, selected bandwidth which will be referred to herein as the source bandwidth. Such a data stream may emanate from any suitable video source.

Data stream 12, in accordance with practice of the present invention, is fed to a splitter (or divider, or dividing structure) 14, whose input side (its left side in FIG. 1, which is referred to herein as engaging structure) engages the source stream. With respect to such an engaged source stream, the splitter operates to split, or divide, the source data stream into two, broadcastable, derivative video data streams (downstream-deliverable data streams) which are represented by arrows 16, 18. Arrow 16, 18 are seen effectively to "bracket" a block 20 which represents suitable, conventional video-data buffer structure. These downstream-deliverable video data streams differ, in that stream 16 is a relatively low-latency, low-resolution stream, and stream 18 is a relatively higher-latency, higher-resolution stream. As will be more fully explained shortly, each of these two data streams is made up of a series of frames which are referred to herein as I-frames, or marker frames, and P-frames, known in the art as predicted frames. The separation between I-frames in each stream is a measure of access latency, with closely spaced I-frames characterizing a data stream with relatively low latency, and more widely separated I-frames characterizing a higher-latency access characteristic.

It is in the region of what is shown in FIG. 1 which extends from source 10 to arrows 16, 18 that practice of the present invention, and apparatus which implements that practice, creates the relevant, differentiated, downstream-deliverable video data streams that enable the present invention to enhance rapid, high-resolution viewer access effectively to a source video data stream. In the region generally marked M in FIG. 1, data streams 16, 18 are multiplexed, preferably slightly time-offset relative to one another, and transmitted, in any suitable fashion, for reception at a user location, such as that generally represented at L in FIG. 1. With respect to a time offset, the low-latency stream is preferably delayed by about ¼-second. The streams may also be synchronized if desired.

Preferably, data streams 16, 18 are appropriately compressed prior to transmission, and any appropriate, conventional compression technique, or techniques, may be employed for this purpose. Preferably also, the combined bandwidth resource called for by data streams 16, 18 for transmission is about the same as that which would be required to transmit a more conventional, single video data stream which is characterized by relatively rapid access and relatively high resolution. Obviously, the particular selected resolutions and I-frame placements (spacing) chosen for data streams 16, 18 will determine this combined data-stream bandwidth requirement. These are matters of user choice, and are not specifically critical to practice of the invention While, as the case is here, the specific approaches that are employed regarding source data stream 12 to effect splitting and compression, and to assure establishment of the preferred bandwidth-utilization characteristic just mentioned, may be entirely conventional, and thus are not discussed in any further or greater detail herein, the act of splitting per se to create the two, mentioned, latency and resolution-differentiated, downstream-deliverable video data streams is unique, and forms an important part and contribution of the present invention. This preparation from a source data stream preferably takes place, as has been generally expressed with respect to the description given so far for FIG. 1, at, essentially, the location from which video data is to be broadcast to viewers.

Continuing with FIG. 1, downstream from where datastream preparation, as just outlined, takes place by operation of the present invention, and preferably at the site of a viewer's television receiver, for example at location L in FIG. 1, a searching (seeking) function, represented in FIG. 1 by a block 22, takes place. Block 22 is thus referred to herein as seeking structure. This searching/seeking function, which occurs in accordance with practice of the invention, is initiated, for example, by a viewer's undertaking a random-access channel-surfing activity, which activity is represented by a block 24 labeled "Start" in FIG. 1. Specifically what takes place in block 22, with respect to the start of a searching or seeking function (in accordance with the invention), will be more fully explained shortly, but for now it is sufficient simply to state that this function initiates quick (very low latency) presentation of uncompressed video data on the screen of the viewer's television receiver. As will also be more fully explained shortly, the searching/seeking function initiated by block 24, and performed by block 22, also implements certain monitoring and selection functions which are undertaken by block 22 in cooperation with a downstream switching block 26 shown in FIG. 1. Block 22 is also referred to herein as monitoring structure, and block 26 as selecting structure.

Disposed intermediate blocks 22, 26 in FIG. 1 is a block 28 which implements appropriate, conventional data-buffering activity between blocks 22, 26.

Operations of the initiation, seeking, monitoring, selecting and switching functions results in a furnishing to the user's television receiver at site L of an appropriate uncompressed output video presentation (or output video data stream) which, in FIG. 1, is represented by broad arrow 30.

Turning attention now to FIG. 2 in the drawings, this figure schematically illustrates data streams 16 and 18. More specifically, FIG. 2 provides an illustration of representative segments, or lengths, of these two data streams, with certain symbology and graphical techniques employed to highlight the differences between these two video data streams. Thus, data stream 16 which, as mentioned earlier, is constructed to be characterized by low latency and relatively low resolution, is pictured as an alternating series of P-frames and I-frames, such as the four P-frames which are shown at 16a, 16b, 16c, 16d, which P-frames alternate, on a one-to-one illustrative basis, with I-frames, such as those shown as 16e, 16f, 16g, 16h. It is thus seen that the I-frames in data stream 16 are spaced at extremely close intervals, and it is this placement of these frames which causes data stream 16 to be characterized with very low access latency.

The individual I-frames and P-frames in data stream 16 are represented in FIG. 2 as small shaded parallelograms, and the size of these parallelograms, in relation to the size of similar parallelograms appearing in data stream 18 (still to be discussed), is intended to reflect the fact that data stream 16 is characterized with a relatively low resolution.

Data stream 18, by way of contrast, includes both I-frames and P-frames organized in a fashion wherein a significant number (which is not specifically illustrated in FIG. 2) of P-frames resides between each two next-adjacent I-frames, only one of which is shown in FIG. 2. Thus illustrated for data stream 18 in FIG. 2 are a string of P-frames 18a, 18b, 18c, 18d, 18e, 18f, 18g which are disposed to the right of the single illustrated I-frame 18h. Trailing to the left side of frame 18h in FIG. 2 are three more P-frames 18i, 18j, 18k. As was mentioned just above, the various I and P-frames in data stream 18 are represented by shaded parallelograms which are larger than those which represent the frames in streams 16. These larger rectangles are used to indicate that the resolution which characterizes data stream 18 is higher than that which characterizes data stream 16. The access latency which characterized data stream 18 is significantly higher also because of the fact that a significantly larger (unknown number) of P-frames resides between each next-adjacent pair of I-frames.

In FIG. 2, the overall left-to-right lengths of the two illustrated data streams are displayed in a fashion to indicate how they relate in time relative to one another over the same general time interval, which is also measured in a left-to-right manner in FIG. 2. As has already been mentioned, stream 16 is preferably delayed (time-offset) relative to stream 18 by an interval of about ¼-second. If desired, the streams may also be synchronized. FIG. 2 should be viewed as illustrating, generally, both of these approaches. At the right side in FIG. 2 is a dash-dot line labeled TD which is intended to represent what is referred to herein as a time datum with respect to which, during transmission, one can imagine that the individual frames in the two data streams pass as time progresses.

In other words, with respect to the frames that are contained in data stream 16, the first frame to pass this time datum is frame 16a, the next 16e, the next 16b, and so on. Similarly, the first frame in data stream 18 to pass the time datum line is frame 18a, followed by frame 18b, followed by frame 18c, and so on.

FIG. 2 thus provides a representation of the way in which the two, multiplexed, divided data streams produced in accordance with practice of this invention flow as downstream-deliverable data streams 16, 18 toward a viewer's site, such as site L in FIG. 1.

According to practice of the invention, when a user seeks access to the image information contained in data streams 16, 18, he or she does this by implementing the seek or start function represented by block 24, whereupon block 22 begins to monitor and examine received data streams 16, 18 for the purpose of detecting the very first I-frame in either of the two data streams which effectively passes a time datum mark, such as dash-dot line TD in FIG. 2. As can be seen in FIG. 2, and with respect to the portions of data streams 16, 18 which are pictured in that figure, the very first I-frame which will be encountered will be frame 16e in low-latency data stream 16.

On this detection of an I-frame occurring, block 26 effectively directs into output signal 30, for presentation on the viewer's reception screen, the low-latency, low-resolution imagery data represented by, and contained within, data stream 16. Inasmuch as the first I-frame encountered has occurred in the low-latency data stream, the searching, monitoring and switching functions implementable by blocks 22, 26 remain active, with block 22 continuing now to search for the next-occurring I-frame which appears in the higher-latency, higher-resolution data stream 18. This "next-occurring" frame, which will be, in accordance with what is pictured in FIG. 2, frame 18h, will "appear" after frames 16a, 16e, 16b, 16f, 16c, 16g, 16d have passed the time datum line. When block 22 then detects the arrival of I-frame 18h in the higher-latency, higher-resolution data stream, it effectively invokes a switching function in block 26 which causes the output signal represented by arrow 30 now to switch to presenting the full content of higher-resolution data stream 18. At this point in time, the searching monitoring and switching functions are concluded, and the viewer is presented with full resolution imagery.

FIG. 3 provides a graphical representation of the content of output signal 30 which exists as a consequence of the searching and switching operations which have just been described. Here, one sees that the order of frame presentation to the screen at site L is 16a, 16e, 16b, 16f, 16c, 16g, 16d, 18h, 18i, 17i, 18k. This sequence of frame presentation clearly demonstrates the powerful low-latency access to video data offered by practice of this invention, followed rapidly by full-resolution image presentation.

Had the first-encountered I-frame been such a frame in data stream 18, output signal 30 would have immediately been derived from this higher-resolution stream, and the activities involving seeking, monitoring and selecting would have been immediately terminated.

Thus, and reviewing now, as a follow-up to the discussion above, various considerations relating (in the context of conventional practice) to the implementation of this invention, a video bit stream composed of intra frames (I-frames) and predicted frames such as P-frames can be accessed at an I-frame only. To control access latency, I-frames are periodically inserted. The I-frame period determines the access latency. If T is the time between I-frames, the access latency corresponds to a random variable uniformly distributed on the interval [O,T). The statistical values which describe this situation are presented in the table shown in FIG. 4.

An I-frame of 1-second gives a maximum access latency of 1-second, and an average access latency of 500-ms. An I-frame period of 0.1-seconds reduces these numbers by a factor of ten. The compromise is bitrate. Decreasing the I-frame period increases the required bitrate for the same output visual quality. In practice an I-frame period is preferably chosen to be near 1-second.

Regarding the structures of the herein proposed two, down-stream-deliverable video data streams, such two video streams are used effectively to reduce access latency. Four parameters are used in the encoding of each stream—namely (a) resolution, (b) frame rate, (c) signal-to-noise ratio (bitrate), and (d) access latency. The low-latency stream is coded in a fashion which compromises resolution, frame rate, and signal-to-noise ratio in exchange for greatly improved (shortened) access latency. The parameters selected for the higher-resolution stream are chosen such that that stream is "accessed", delivered video-signal quality is excellent. Sample values of appropriate "dual-stream" parameters, and of related, representative access latencies, are shown in the tables presented in FIGS. 5 and 6.

The invention thus proposes an efficient, effective, and relatively simple method and apparatus for improving, by minimizing, access latency to a high-resolution video data stream. Utilizing the approach of splitting a source data stream into two latency- and resolution-differentiated data streams for transmission, the method and apparatus of the invention offer low-latency access time wherein the maximum delay (latency) at a viewer's site is never greater than the time distance between I-frames in the low-latency, low-resolution stream. A high-resolution image is presented to a viewer, in all cases, just as soon (after the viewer requests access) as the higher-latency, higher-resolution stream next presents an I-frame. Transmission of the two, proposed, divided video data streams can be accomplished without taxing available bandwidth resources, and specifically by constructing these two data streams in such a manner that, collectively, they require only about the same bandwidth as that required by a typical high-resolution, modest access-latency, single data stream.

Those generally skilled in the art will understand that, while a preferred and best-mode embodiment of the invention has been described and illustrated herein, and a modification mentioned regarding transmission of the proposed, two, divided streams in a synchronized manner, other variations and modifications are possible that come within the scope of the invention.

I claim:

1. A method associated with minimizing random-access latency to a compressed source video data stream which is characterized with one decoder access latency and one spatial resolution, said method comprising:

engaging such a source video data stream;

deriving, from that engaged data stream, two, broadcastable, downstream-deliverable video data streams that are characterized by differing, respective decoder access latencies and spatial resolutions, one of which broadcastable, downstream-deliverable video data streams is characterized, relatively speaking, by a low decoder access latency and a low spatial resolution, and the other of which is characterized, in comparison, by a higher decoder access latency and a higher spatial resolution, wherein, relatively speaking, said low decoder access latency is associated with more closely spaced I-frames in said one broadcastable, downstream-deliverable video data stream in comparison to more widely separated I-frames in said other broadcastable, downstream-deliverable video data stream; and transmitting said two, broadcastable, downstream-deliverable video data streams using a first communication channel, wherein said transmitting comprises multiplexing said two, broadcastable, downstream-deliverable video data streams with a time-offset relative to each other, wherein said one broadcastable, downstream-deliverable video stream is delayed relative to said other broadcastable, downstream-deliverable video stream.

2. The method of claim 1, wherein the delay is about ¼ second.

3. A method, practicable at a video-data reception location, associated with minimizing random-access latency at that location to received compressed video data which is characterized by a pair of prior-derived, broadcastable, video data streams, one of which is further characterized by one decoder access latency and one spatial resolution, and the other of which is further characterized by another decoder access latency which is larger than the mentioned one decoder access latency, and another spatial resolution which is larger than the mentioned one spatial resolution, and where such decoder access latencies are differentiated by different time spacings that exist between designated video I-frames placed in the data streams, with larger spacings between such I-frames relating to larger decoder access latencies, and with smaller spacings between such I-frames relating to smaller decoder access latencies, said method comprising:

seeking access to the received, two-video-data-stream characterized video data, wherein the one video data stream is delayed relative to the other video data stream in the received, two-video-data-stream characterized video data, in relation to said seeking, monitoring the two, associated video data streams to detect the first occurrence in either stream of an I-frame, on detecting such an occurrence, selecting the associated data stream to be the source for a viewable output stream, and (a) if the first detected occurrence involves an I-frame in the mentioned other video data stream, ending the monitoring process and the selecting process, but (b) if the first detected occurrence involves an I-frame in the mentioned one video data stream, continuing to monitor the other video data stream to detect therein the first next occurrence of an I-frame, and on that detection taking place, switching to and selecting that other video data stream to be the source for a viewable output stream, and then ending the monitoring process and the selecting process.

4. Apparatus associated with minimizing random-access latency to a compressed source video data stream which is characterized with one decoder access latency and one spatial resolution said apparatus comprising:

engaging structure for engaging a source video data stream;

deriving structure operatively connected to said engaging structure, operable to derive two, broadcastable, downstream-deliverable video data streams from such an engaged source data stream, wherein said two, downstream-deliverable video data streams are characterized by differing, respective decoder access latencies and spatial resolutions, one of which broadcastable, downstream-deliverable video data streams is characterized, relatively speaking, by a low decoder access latency and a low spatial resolution, and the other of which is characterized, by comparison, by a higher decoder access latency and a higher spatial resolution, wherein, relatively speaking, said low decoder access latency is associated with more closely spaced I-frames in said one broadcastable, downstream-deliverable video data stream in comparison to more widely separated I-frames in said other broadcastable, downstream-deliverable video data stream; and transmitting structure for transmitting said two, broadcastable, downstream-deliverable video data streams over a first communication channel, wherein said transmitting structure comprises a multiplexer for multiplexing said two, broadcastable, downstream-deliverable video data streams with a time-offset relative to each other, wherein said one broadcastable, downstream-deliverable video stream is delayed relative to said other broadcastable, downstream-deliverable video stream.

5. Apparatus which is operable to practice a method implementable at a video-data reception location, for use in association with minimizing random-access latency, at that location, to received, compressed video data which is characterized by a pair of prior-derived, broadcastable, video data streams, one of which is further characterized by one decoder access latency and one spatial resolution, and the other of which is further characterized by another decoder access latency which is larger than the mentioned one decoder access latency, and another spatial resolution which is larger than the mentioned one spatial resolution, and where such decoder access latencies are differentiated by different time spacings that exist between designated video I-frames which are placed in the data streams, with larger spacings between such I-frames relating to larger decoder access latencies, and with smaller spacings between such I-frames relating to smaller decoder access latencies, said apparatus comprising:

seeking structure operable at the mentioned location to access such received video data, wherein the one video data stream is delayed relative to the other video data stream in the received video data, monitoring structure operatively connected to said seeking structure for monitoring the two video data streams associated with such accessed video data for the purpose of detecting the first occurrence in either stream of an I-frame, and selecting structure operatively connected to said monitoring structure, operable on the detection of such an I-frame occurrence to select the associated data stream to be the source for a viewable video-data output stream, with said selecting structure specifically operating whereby (a) if the first detected occurrence of an I-frame relates to the mentioned other video data stream, the selecting structure effects an ending of the monitoring process and the selecting process, but (b) if the first detected I-frame relates to the mentioned one video data stream, the selecting structure effects the continuation of monitoring by the monitoring structure of the other video data stream to detect therein the first next occurrence of I-frame, and on such a detection in the other video data stream taking place, effects a switching to and selecting of that other video data stream to be the source for a viewable output video data stream, and with the selecting structure also then effecting an ending of the operations of said monitoring and selecting structures.

* * * * *